United States Patent [19]

Hunter et al.

[11] Patent Number: 5,084,787
[45] Date of Patent: Jan. 28, 1992

[54] METHOD AND APPARATUS FOR DATA DECODING AND PROCESSING

[75] Inventors: Timothy M. Hunter, Webster; Arthur J. Levy, Schenectady, both of N.Y.

[73] Assignee: The United States of America as represented by the United States Department of Energy, Washington, D.C.

[21] Appl. No.: 490,229

[22] Filed: Mar. 8, 1990

[51] Int. Cl.⁵ ................................................. G11B 5/09
[52] U.S. Cl. .......................................... 360/32; 360/48
[58] Field of Search ........................ 360/6, 48, 32, 72.2

[56] References Cited

U.S. PATENT DOCUMENTS

| | | |
|---|---|---|
| 3,293,608 | 12/1966 | Klein et al. |
| 3,602,892 | 8/1971 | Norris et al. |
| 4,084,151 | 4/1978 | Penner .................................... 360/6 |
| 4,202,040 | 5/1980 | Whitworth et al. |
| 4,410,917 | 10/1983 | Newdoll et al. |
| 4,422,111 | 12/1983 | Moeller et al. ...................... 360/48 |
| 4,445,195 | 4/1984 | Yamamoto |
| 4,541,019 | 9/1985 | Precourt ............................... 360/48 |
| 4,568,912 | 2/1986 | Kitamura et al. |
| 4,862,394 | 8/1989 | Thompson et al. .................... 360/6 |
| 4,914,526 | 4/1990 | Sakata et al. ........................ 360/48 |

Primary Examiner—Vincent P. Canney
Attorney, Agent, or Firm—Virginia B. Caress; William R. Moser; Richard E. Constant

[57] ABSTRACT

A system and technique is disclosed for automatically controlling the decoding and digitizaiton of an analog tape. The system includes the use of a tape data format which includes a plurality of digital codes recorded on the analog tape in a predetermined proximity to a period of recorded analog data. The codes associated with each period of analog data include digital identification codes prior to the analog data, a start of data code coincident with the analog data recording, and an end of data code subsequent to the associated period of recorded analog data. The formatted tape is decoded in a processing and digitization system which includes an analog tape player coupled to a digitizer to transmit analog information from the recorded tape over at least one channel to the digitizer. At the same time, the tape player is coupled to a decoder and interface system which detects and decodes the digital codes on the tape corresponding to each period of recorded analog data and controls tape movement and digitizer initiation in response to preprogramed modes. A host computer is also coupled to the decoder and interface system and the digitizer and programmed to initiate specific modes of data decoding through the decoder and interface system including the automatic compilation and storage of digital identification information and digitized data for the period of recorded analog data corresponding to the digital identification data, compilation and storage of selected digitized data representing periods of recorded analog data, and compilation of digital identification information related to each of the periods of recorded analog data.

18 Claims, 5 Drawing Sheets

METHOD AND APPARATUS FOR DATA DECODING AND PROCESSING

The government has rights in this invention pursuant to Contract No. DE-AC12-76SN00052 awarded by the U.S. Department of Energy.

BACKGROUND OF THE INVENTION

The present invention relates to a data processing system and, more particularly, to a system and technique for automatically controlling the decoding and digitization of an analog tape.

In a variety of systems involving the acquisition of information, it is known to employ recording techniques which receive a few or large number of different analog signals representing measurements, test data, or similar information requiring additional processing. While the information is originally recorded in analog form on a tape or other recording medium, it is often desirable to convert the analog signals to digital form prior to subsequent processing with digital systems. In many instances, the information which is being acquired is of a type which is only available in a form of such analog signals, but the digital processing is required to analyze or derive or perform computations for determining other parameters of the operation and performance of the system. By way of example, information representing temperatures, pressures, flow rates, and similar parameters for engines, steam generator tubes, chemical processes, and the like are all developed from analog signals which are recorded on an analog medium prior to conversion to digital form for subsequent computations and analysis.

When acquiring such analog information, known techniques have recorded the analog information on multiple channels or tape tracks for various periods of analog data acquisition. Each period of data acquisition may be located at a certain position on each of the channels of the analog tape and that position was generally indicated by voice signals stored on the analog medium before and after the period of information recording. Subsequently, in order to digitize the acquired analog information, it was necessary to load the tape on a playing system, manually operate the tape playing system to locate individual periods of recorded analog information, record a code representing the beginning and end of each individual period, create a computer file representing each of the information periods, and manually correlate the digization of the information periods for each of the files identified from the data acquisition process. Since each tape may contain numerous periods of analog information representing a variety of data, the above technique for digitizing such data was cumbersome and time-consuming and required a substantial manual effort to implement the digitization.

In attempts to reduce the complexity of the digitization process, digital codes have been placed on one or more tracks or channels of an analog tape to incorporate identification information. For example, such codes may represent the start and stop position with respect to the period of analog data recording and thereby indicate the location of usable data on each of the tracks of the multi-channel system. While such codes may aid in the identification of the position of stored data on an analog tape, the need for operator intervention and coordination still reduces the efficiency with which the analog information can be digitized for subsequent processing.

Accordingly, the present invention has been developed to overcome the specific shortcomings of the above-known and similar techniques and to provide an improved system and technique for automatically digitizing analog information stored on an analog medium.

SUMMARY OF THE INVENTION

In accordance with the present invention, there is provided a real time system and technique for providing microprocessor and computer control of the playback of an analog medium to digitize identified periods of analog data on one or more channels of a recording medium and to compile and utilize digital information stored on the analog medium to control such digitization and compilation. In order to identify the periods of information stored on the analog medium and therefore the position of the information on the recording medium, the analog tape is formatted so that digital codes are recorded at predetermined positions on the analog medium during data acquisition to represent such parameters as the start of tape, end of tape, and information identification blocks.

In the present instance, each information identification block includes a three bit digital marker code (BCDM) recorded immediately before an eight digit (32 bit) identification code (BCD) containing digital information representing various characteristics or aspects of the recorded information. The eight digit code is a binary coded decimal which is then followed by a start of data (SOD) marker code indicating that the analog data for the identified acquisition period immediately follows. A digital end of data (EOD) marker code is recorded immediately after the period of recorded analog information to designate the end of the analog data for the identified information period.

In accordance with a further aspect of the invention, the system includes an analog tape player which receives and plays recorded information from an analog tape of one or multiple tracks to provide output on one or multiple channels. The multiple channels are coupled to a digitizer under the control of a host computer and microprocessor decoder and interface system to enable the automatic digitization of all or selected portions of the analog tape without operator intervention. The decoder and interface system is under the control of a microprocessor which controls certain program functions to allow detection, reading and control of the digitizer using the BCDM, SOD and EOD marker codes and the eight digit BCD identification codes associated with a particular period of recorded analog information. The microprocessor is programmed to start and stop the analog tape player, receive and decode the digital marker codes and BCD identification data, and start and stop the digitizer in response to instructions programmed and received by a host computer. The decoder and interface system may also be configured to allow manual input and display of system control in lieu of the host computer control.

In still another aspect of the invention, the programming of the host computer and microprocessor is configured to serially scan the analog tape to digitize each of the periods of recorded analog information (data). In this embodiment, the programs control the analog tape to rewind to the start position as represented by a digital start of tape (SOT) code. Thereafter, the programs serially search for the BCD marker code associated with each position of recorded analog data. After reading the BCD identification data (codes) following the BCD marker code, the SOD marker code is sensed to signal the initiation of the digitizer and enable the receipt of the digitized information by the host computer. Upon receipt of the EOD marker code, the digitizer is stopped and the scan of the analog tape for the next succeeding BCD marker code is performed. These steps are repeated sequentially for each period of analog information until a digital end of tape (EOT) code is sensed at which time the processing is terminated or continued in accordance with the programming of the host computer.

In a further aspect of the invention, the host computer and microprocessor are programmed to search for one or more particular identification codes representing selected periods of the recorded analog information. In this instance, the tape is automatically rewound to the start position and thereafter searched for each of the identified BCD identification codes for the selected analog data. When one of the BCD identification codes is found, the SOD code following that BCD identification code is used to enable the digitizer and initiate the host computer read of the subsequent period of analog data associated with the selected BCD identification code. Upon receipt of an EOD marker code following such period of analog data, the digitizer is disabled and the host computer read terminated. If there are other selected BCD identification codes to be reviewed and the corresponding analog data digitized, the search continues for the BCD identification codes representing that data and the above steps are repeated in each instance to allow digitization of the selected periods of associated analog information. Thereafter, the control is returned to the host computer to stop the processing or proceed with additional programmed operations.

In a still further aspect of the invention, the host computer and microprocessor are programmed to develop a directory of the tape positions of the periods of recorded analog information and the BCD identification codes associated with or corresponding to each of those periods. In this instance, the programs of the host computer and microprocessor cause the analog tape to be rewound to the start of tape position and therafter search for the BCD marker codes associated with each period of recorded analog informaion. When the BCD marker code is found, the subsequent BCD identification data is then read and transferred to the host computer to compile the identification data for each period of analog data. The search continues serially for each BCD marker code to enable the subsequent compilation of all associated BCD identification codes until all BCD identification codes on the tape have been compiled and stored by the host computer. An end of tape code indicates that all BCD identification codes have been obtained and causes the programming through the host computer to stop the operation or continue new functions in accordance with the host computer programming.

It is therefore a feature of the invention to provide an improved data processing system for automatically digitizing analog information.

It is a further feature of the invention to provide a system and technique which employs digital marker codes associated with stored analog information to enable the automatic digitization of the analog information.

It is still another feature of the invention to provide a computer control system and technique which automatically controls a tape player and digitizer to selectively and automatically digitize one or more periods of recorded analog data.

It is yet another feature of the invention to utilize a microprocessor controlled decoder and interface system to receive digital marker and identification codes and control analog tape movement in response to such codes to enable digitization in connection with preprogrammed control from a host computer.

Still another feature of the invention is to provide an improved system and technique for sequentially scanning an analog tape and automatically controlling the movement of the analog tape to digitize one or more periods of analog information.

Still a further feature of the invention is to provide a data processing system and technique for selectively searching for periods of recorded analog data in response to selected digital identification codes and therafter digitizing the analog information associated with those digital identification codes.

Yet still another feature of the invention is to provide a system and technique for processing data stored on an analog tape to enable the compilation of identification information for each period of analog data recorded on the tape.

Other objects, advantages and novel features of the invention will become apparent from the following detailed description of the invention when considered in conjunction with the accompanying drawings wherein:

DETAILED DESCRIPTION OF A PREFERRED EMBODIMENT

Figure 1:
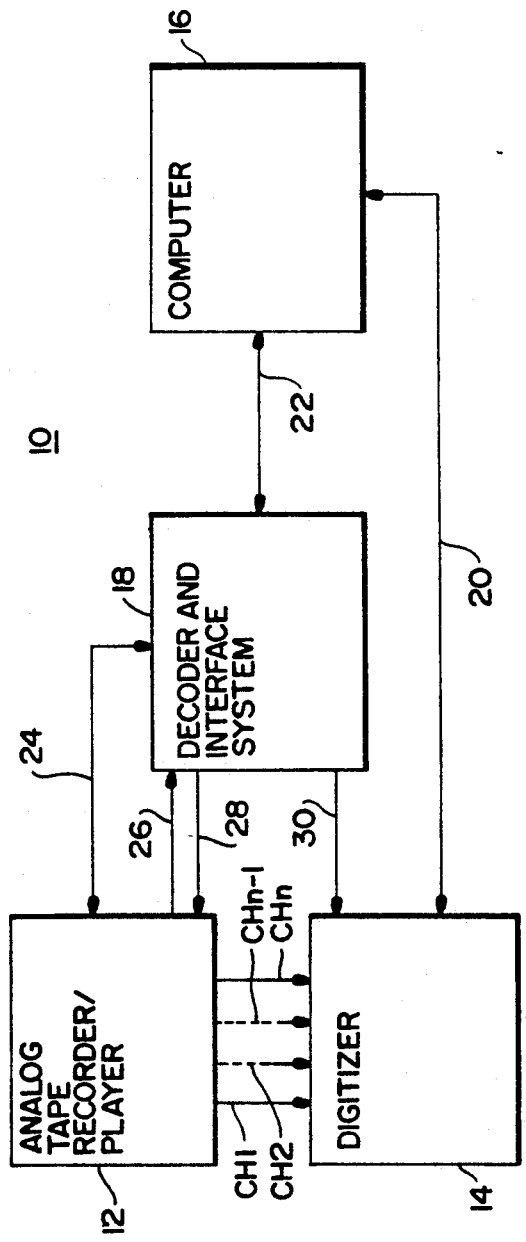
FIG. 1 is a schematic block diagram illustrating one embodiment of the invention.

Referring now to the drawings, wherein like numerals are used to refer to like elements throughout, there is shown in FIG. 1 a data processing and digitizing system in accordance with one embodiment of the present invention. The system 10, by way of illustration only, includes a conventional analog tape recorder/player which is typically capable of providing an output of analog information from one or more channels/tracks of an analog tape. The analog tape player may be, for example, a Honeywell H90 tape recorder/player which will play a conventional one inch 14 track magnetic tape to provide analog information from each of said tracks/channels over lines CH1, CH2 ... CHn-1, CHn where n in this instance is 14. The channel outputs CH1-CHn are coupled to a conventional digitizer 14 which converts the analog information provided as input to each of the channels CH1-CHn to a digital code upon initiation of the digitizer operation. The system further includes a host computer 16 and a decoder and interface system 18 which are coupled to one another and to the analog tape player 12 and digitizer 14 and programmed to allow the automatic digitization of periods of analog information recorded on the analog tape for playback on the player 12.

In the present embodiment, the host computer 16 may be a Hewlett Packard 1000 coupled to communicate over line 20 with the digitizer 14 and thereby allow the transfer of information from digitizer 14 for storage and processing in the host computer 16. The host computer 16 is also coupled through line 22 to the decoder interface system 18 to allow communication and control in accordance with programming of the host computer and decoder interface system. This programming, as will be subsequently described, selectively operates the playback of the analog tape player 12 and digitizer 14 to automatically digitize all or selected analog information and perform other automatic functions in response to digitally recorded information on the analog tape.

As will be subsequently described in connection with FIG. 2, specific digital codes are recorded on the tape in a predetermined format and provided to the decoder interface system over line 26 to allow the detection of the digital codes necessary to cooperate with the program control for automatically controlling digitization and the other selected functions. Control of the playback of the analog tape player 12 is provided over line 28 from the decoder and interface system 18 while initiation and disablement of the digitizer 14 is controlled through information transmitted over line 30 from the decoder interface 18. Initiation of the system 10, including power up of the analog tape player 12, digitizer 14 and decoder interface system 18, along with other initiating functions, is provided over lines 24, 20 and 22, respectively. It should be noted that while single lines are used to denote information flow, it will be apparent that such single lines may represent multiple lines or a data bus as required for the desired information flow in accordance with conventional techniques.

Figure 3:
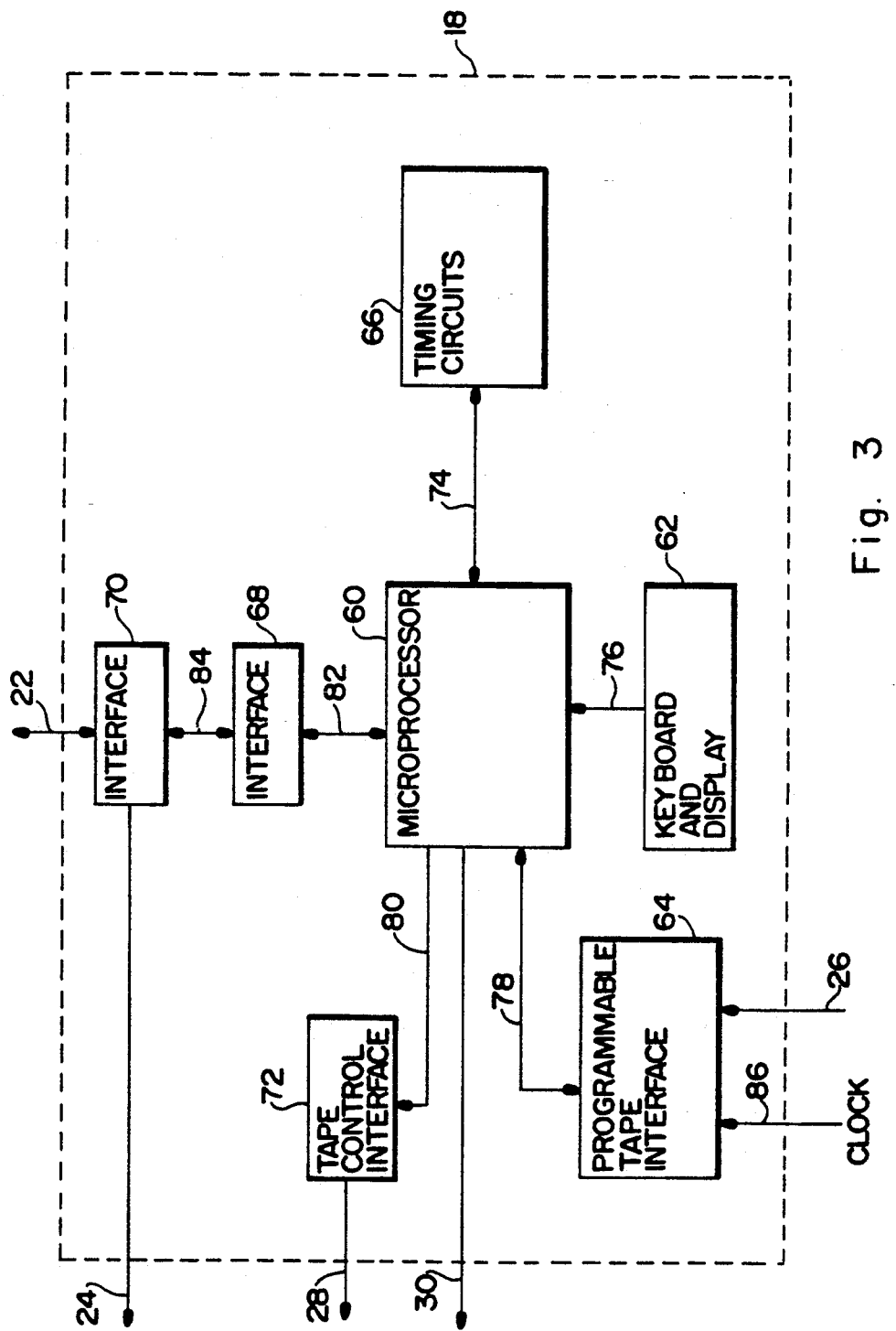
FIG. 3 is a more detailed schematic block diagram of one example of the decoder and interface system for use in connection with the system of FIG. 1.

Although the decoder and interface system 18, as well as the host computer 16, could be implemented with a variety of conventional components and devices, there is shown in FIG. 3 a more detailed block diagram of one embodiment of a decoder and interface system 18. Specifically, the system 18 may include a microprocessor 60 which may be a PROLOG 7801A 8085 microprocessor with sufficient ROM, RAM and other memory capacity to perform the desired program operations, coupled to a keyboard and display 62 through lines 76. The keyboard and display 62 may, for example, be a PROLOG 7303 keyboard/display card. The keyboard and display allows conventional manual input and control of the microprocessor 60 in connection with the performance of the data processing and digitization in lieu of control by host computer 16. Alternatively, the keyboard and display 62 can be used in conjunction with the host computer 16 to coordinate local and remote control in connection with a variety of desired functions for operation of the data processing and digitization system 10.

The decoder and interface system 18 further includes a programmable tape interface 64 which receives the digital codes recorded on the analog tape over line 26 under the control of the microprocessor 60 through line 78 Tape interface 64 may be of any construction with conventional components and logic to allow the controlled transfer and clocking of data over line 78 to the microprocessor 60 in response to commands and timing control from the microprocessor 60. The microprocessor 60 is also coupled to a tape control interface 72 through line 80, for the start stop and other control of the tape player 12 through line 28. The tape control interface 72 may be, for example, a PROLOG 7904 decode utility card coupled to be compatible with and perform the desired functions instructed by the microprocessor 60 through line 80.

Timing circuits 66, which may be implemented with PROLOG 7308 counter/timer cards, are coupled through line 74 for providing timeout, time cycles and time measurement functions in response to and in connection with the microprocessor 60 control of the tape player 12 and digitizer 14. Communications from the microprocessor 60 to the host computer 16 are directed through line 82 to an interface 68 which is coupled through line 84 to interface 70 and thence to the host computer 16 through line 22. The interface 68 may be an Applied Micro Technology ST 4311 IEEE 488 communications interface while the interface 70 may be a conventional Hewlett Packard interface bus. In addition to communicating with microprocessor 60 through the interface 68, 70 over line 22, the host computer 16 is coupled through line 24 from the interface 70 to the analog recorder/player 12 for power up and initiation. The microprocessor card and related cards in decoder 18 may be contained in a PROLOG WR-16 card cage and motherboard with power supplied from a PROLOG 7920 in rack power supply.

In operation, the host computer 16 communicates with the microprocessor 60 through the described interfaces and issues commands in response to programming to initiate and control programmed functions in the microprocessor 60. The microprocessor 60 responds to the commands and in implementing the commanded functions, receives digital coded information from the analog tape. The microprocessor 60 controls the play of the analog tape to detect such digital information while coordinating the control of the digitizer with the movement and positioning of the analog tape to perform the function to be implemented by the programming of the microprocessor 60 and host computer 16.

Figure 2:
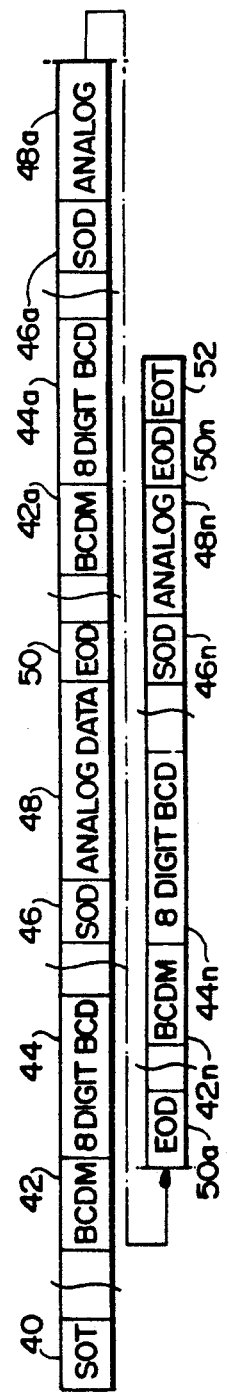
FIG. 2 is a block diagram schematically illustrating the tape format for the positioning of digital codes on an analog tape in relation to recorded analog data for use in connection with the system of FIG. 1.

Referring now to FIG. 2, there is shown the format of an analog tape which includes encoded digital codes for enabling the implementation of various functions in connection with the automatic processing and digitizing system 10 of FIG. 1. Specifically, the format includes a plurality of digital codes encoded on the analog tape in association with the recording of specific periods of analog information. Each of the digital codes are recorded by conventional apparatus during the data acquisition stage of the specific activity involved. In the present format of the preferred embodiment of the invention, the encoded digital codes include a start of tape (SOT) code 40, an end of tape (EOT) code 52, and at least one or more series of codes associated with, or corresponding to individual periods of the analog data and including a binary coded data marker (BCDM) code 42, an eight digit (32 bit) binary coded decimal (BCD) identification code 44, a start of data (SOD) marker code 46, and an end of data (EOD) marker code 50.

The format is arranged such that the SOT code 40 is positioned at the beginning of the analog tape and the EOT code 52 is positioned at the end of the analog tape. The SOT code is followed by a first BCDM code 42 which may be a three digit code 101 placed on the analog tape just prior to each eight digit binary code representing the BCD identification data associated with a respective period of recorded analog information at that position on the analog tape. The SOD marker code 46 may be a three digit binary code 011 recorded after the eight digit BCD identification code and immediately coincident with the beginning of the analog data acquisition recording. The EOD marker code may likewise be a three digit binary code 110 which is placed immediately following completion of the period of recorded analog data for the associated recording period. Each of the codes 42, 44, 46, and 50 are repeated as codes 42a, 44a, 46a, and 50a in connection with the next successive period of recorded analog data and similar codes are recorded in connection with each successive periods of analog data recording until the last codes 42n, 44n, 46n, and 50n are recorded in connection with the last period of analog data recording 48n.

For purposes of illustration and understanding of the operation of various embodiments of the present invention, a description of the recording of analog data will be made in connection with steam generator tube measurements for the purpose of allowing an analysis of steam generator eddy currents. In the present example, the SOT, BCDM, SOD, EOD and EOT codes are recorded on the tape at the positions and in connection with the analog periods of recorded data relating to steam generator tube measurements in the manner previously described. However, the eight digit binary coded decimal identification codes 44, 44a-44n include information relating to each of the tubes which is the subject of the examination or testing period.

Specifically, the eight digit BCD identification code may include such information as time of day, length of steam generator tube, direction of data run through tube, steam generator number, tube coordinate, or a variety of other pertinent test data or identification information as desired in connection with the analog data to be analyzed. It is apparent that the above digital information is only exemplary of the type of information which could be employed as BCD identification information in connection with steam generator inspection data or any other recordings of analog information. Likewise, the number of digits in each of the codes is by way of example only, it being apparent that any number of digits could be used provided that sufficient information could be provided to accomplish the goals of the data collection, identification, and analysis.

Figure 4:
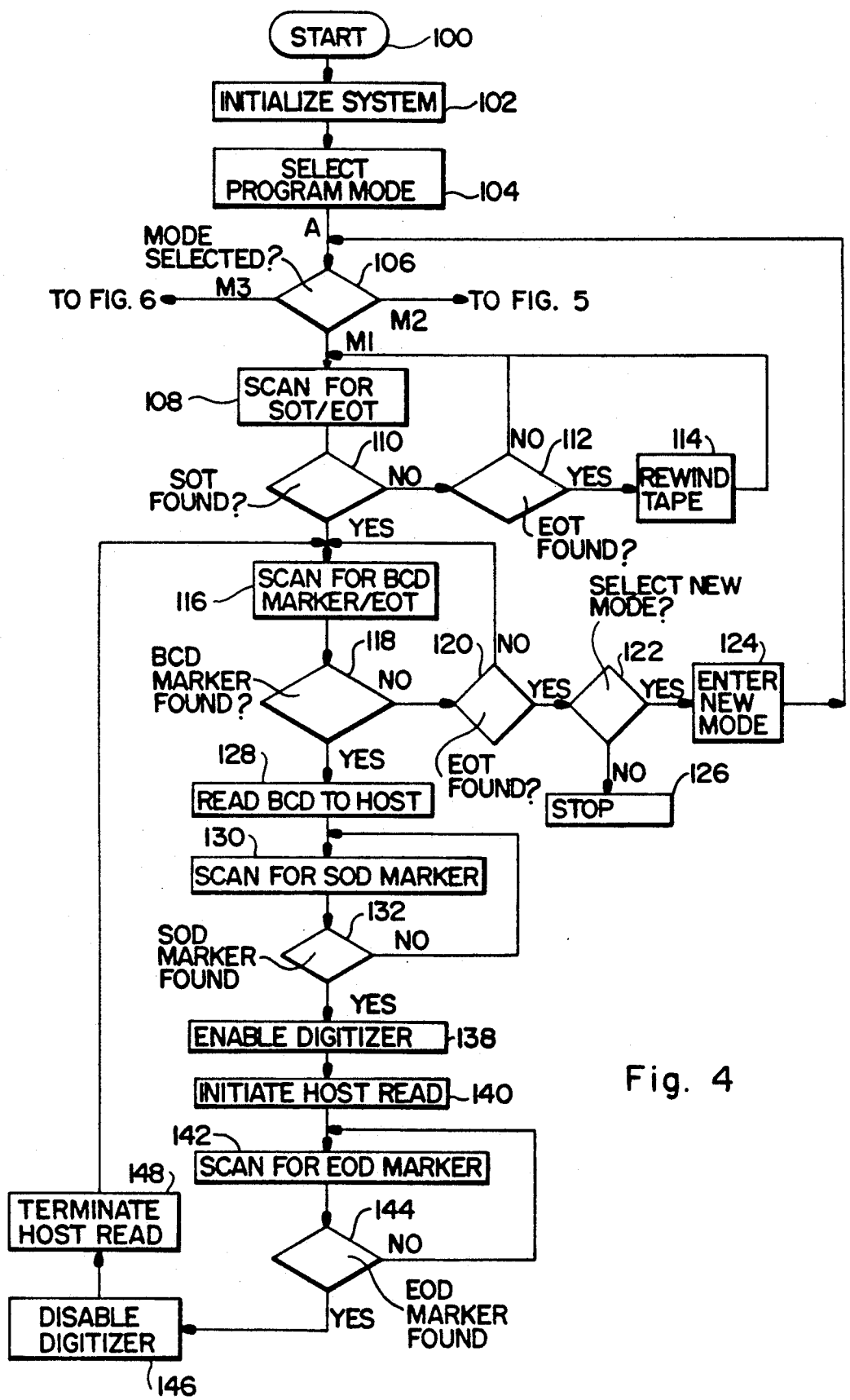
FIG. 4 is a block flow diagram of one embodiment of the host computer and microprocessor programming for implementing an automatic sequential digitization of one or more periods of analog information recorded on an analog tape.
Figure 5:
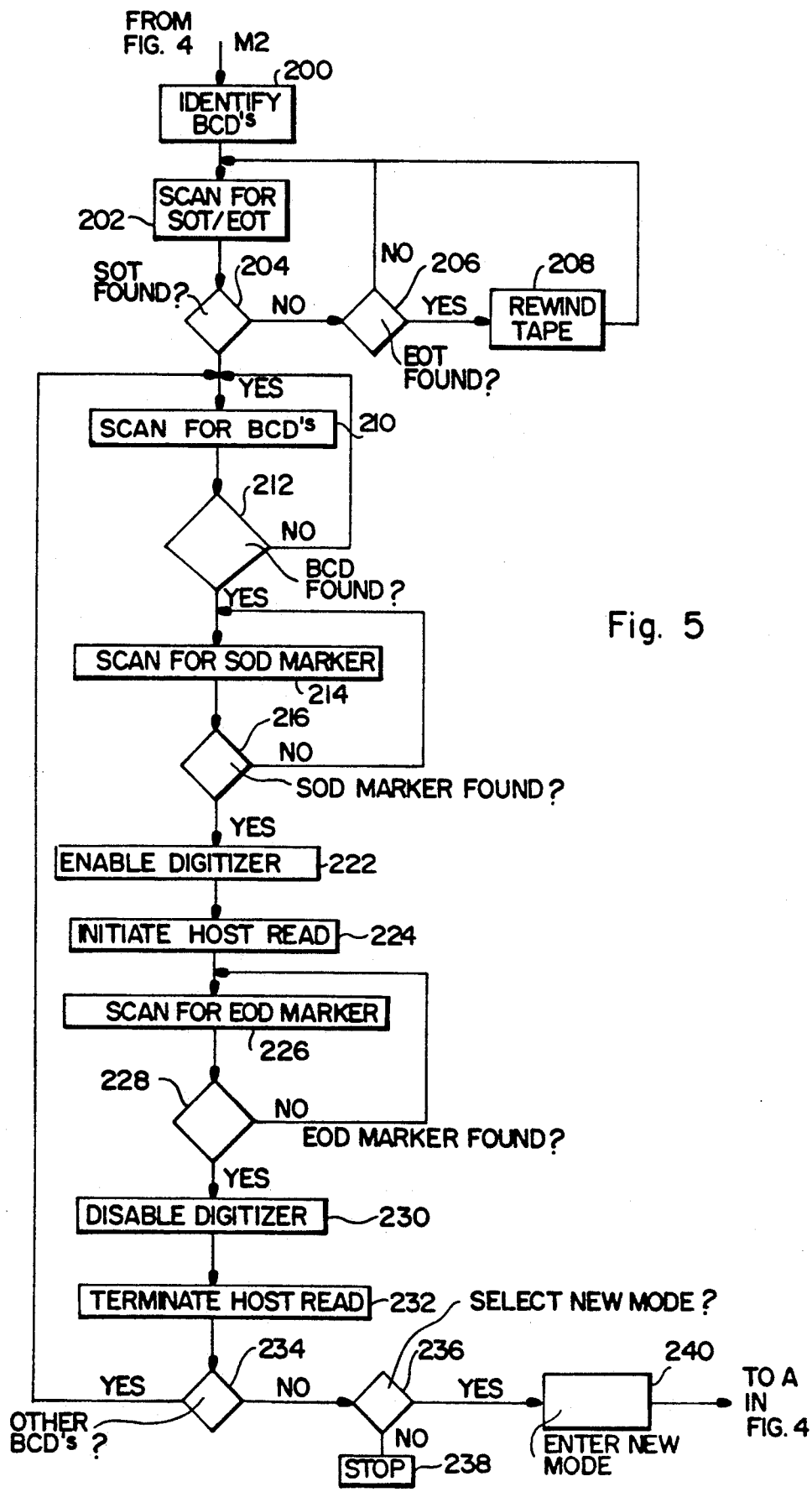
FIG. 5 is a block flow diagram of another embodiment of the host computer and microprocessor programming for implementing the automatic digitization of specifically selected periods of recorded analog data in the system of FIG. 1.
Figure 6:
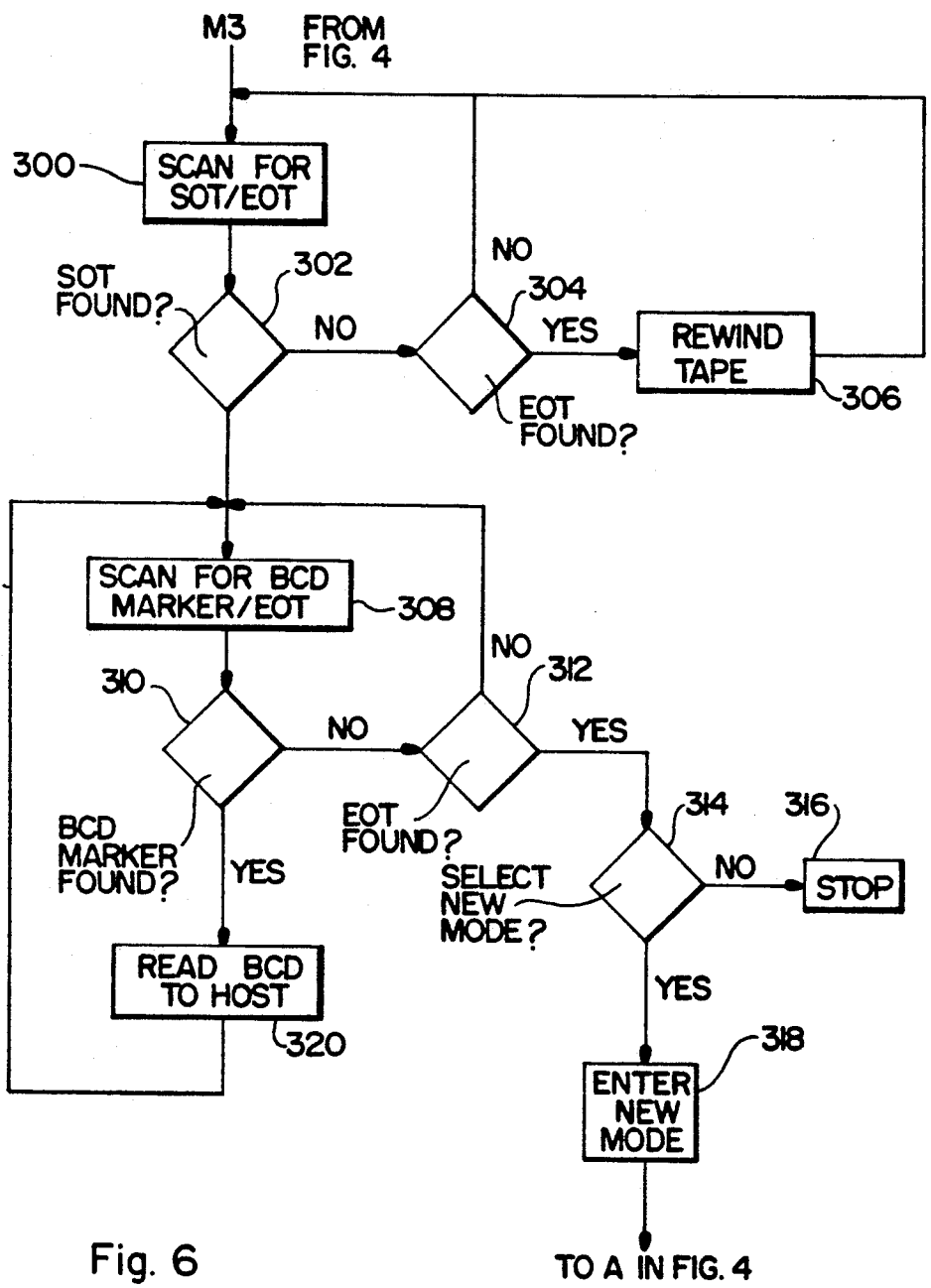
FIG. 6 is a block flow diagram of another embodiment of the host computer and microprocessor programming for implementing a compilation of identification data for each of one or more periods of recorded analog data on an analog tape in the system of FIG. 1.

Referring now to FIGS. 4-6, the tape format described in connection with FIG. 2 may now be used in connection with the data processing system 10 of FIG. 1 to allow the automatic control and digitization of the recorded analog information. Specifically, referring first to FIG. 4, there is shown a flow diagram of the programming for host computer 16 and the microprocessor of decoder interface system 18 necessary to enable the automatic digitization of the analog data without operator intervention or coordination. As was described with respect to the prior art, previous techniques of digitization required the manual identification of voice data and operator control in response to that voice data to individually identify the periods of recorded analog information and subsequent digitization.

Using the system 10, the only operator involvement in connection with the digitization once the data has been taken in the format specified with respect to FIG. 2, is the required loading of the tape on the tape player 12 and the initiation of the program control through host computer 16. The level of operator control and interface can optionally be increased if the optional local control through keyboard and display 62 is utilized. However, using the host computer 16, complete automatic digitization or implementation of other control functions is implemented without operator intervention.

Referring again to FIG. 4, the programmed start is generally designated by block 100 which indicates operator initiation of the computer programming in host computer 16. Thereafter, the programming through block 102 performs initialization functions including, but not limited to system power up and a variety of other functions if desired (e.g., system status, error code detection, operational status of tape player 12 and digitizer 14, etc.) Such functions are performed in connection with a variety of computer controlled processing systems and will be apparent to one skilled in the art.

Following system initiation, the programming through block 104 selects in the host computer 16 the mode of system operation to be selected through the microprocessor 60 of the decoder interface system 18. In the present example, the program of host computer 16 is shown to be capable of selecting three modes M1, M2 and M3 through programming block 106. However, it will be apparent that such operational modes are only by way of illustration and could include a variety of additional modes depending upon the results desired in connection with the digitization of the analog information.

In FIG. 4, the program mode M1 is depicted as the program proceeds through block 108 where microprocessor 60 is programmed to start the tape player 12 through line 28 and scan for the SOT/EOT digital codes through block 108. If the tape is not at the beginning, the SOT code will not be found in block 110 and the microprocessor 60 will continue to scan for the EOT through block 120 until the EOT is found. At that point, the tape will be rewound through block 114 and the SOT/EOT continued. After rewind, the SOT will be detected through block 110 and thereby initiate through block 116 a scan for BCD marker code or EOT code. If there is no analog information on the tape and therefore no BCD marker code, the tape will continue to be scanned through block 120 until the EOT is found, at which time the program will determine if any additional modes are programmed through block 122 through the host computer program. If no new modes are to be processed, the system will stop through block 126. However, if there are additional modes of processing to be performed by the host computer 16 programming, the new processing mode will be entered through block 124 and the control transferred to the mode determination through block 106.

If after the SOT code is identified, the scan for the BCD marker identifies a BCD marker code through block 118, the microprocessor programming causes the host computer 16 to read the BCD identification data following the BCD marker code through block 128. Thereafter, the programming scans the tape following the BCD identification data for the SOD/EOD marker codes. If no SOD marker code is found, the scan continues through blocks 130 and 132 until the SOD marker code is found, at which point the programming enables the digitizer through block 138 over line 30. The decoder and interface system 18 communicating with the host computer 16 through line 22 and the digitizer 14 communicating with the host computer through line 20, allows response to programming through block 140 to initiate reading by the host computer 16 of the digitized data for the period of analog data corresponding to the previously read BCD identification on the tape. The digitization continues while the tape is scanned for the EOD marker code through block 142 and 144. As long as the EOD marker code is not found, the scan continues and the digitized data is transferred to the host computer 16. Once the EOD marker is identified through block 144, the programming signals the disablement of digitizer 14 through block 146, and terminates the host computer 16 read of the digitizer output through block 148. Thereafter, the programming returns as the tape continues to scan for the next BCD marker through blocks 116 and 118. This process continues until the EOT code is found through block 120, at which time the operation is stopped or a new mode is programmed in accordance with the prior discussion in connection with blocks 122 and 124.

As will be appreciated from the above description, the programming of the host computer 16 and decoder interface system 18 through microprocessor 60 in accordance with the flow diagram of FIG. 4 will result in an automatic scan of the analog tape to read the BCD identification data for each period of analog recording into the host computer 16 along with the digitized analog data associated with that identification data. Once all periods of recorded analog data have been digitized under the control of the described programming, other computer analysis and computation in connection with the digitized data can be performed in a conventional manner in the host computer 16. In this way, the playback of the analog tape and the digitization of the analog information on that tape is automatically controlled to achieve digitization without operator intervention or time consuming manual manipulation of the recorder 12 and digitizer 14.

In still another embodiment of the invention, selected ones of the periods of recorded analog information can be digitized without requiring the digitization of all recorded analog data on a selected tape. This mode of operation is depicted in FIG. 5 in connection with the programmed function M2 from the flow diagram of FIG. 4. In this instance, the host computer 16 in selecting the programming mode M2 also programs the 8 digit BCD identification codes associated with the periods of recorded analog information which are desired to be digitized. Accordingly, in block 200 of FIG. 5, the identified BCD identification codes are read and the tape player 12 initiated and scanned for SOT/EOT digital codes through blocks 202 and 204. Again, as in connection with FIG. 4, if the tape is not at the beginning, the scan continues through block 204 and block 206 until the EOT code is found. Once the EOT code is found, the tape is rewound to the beginning position and the scanning reinitiated through block 202.

When the SOT code is found, the programming then scans for the BCD identification codes provided in block 200 through the programming blocks 210 and 212. If no such BCD code is found, the scan continues through block 212 until one of the BCD identification codes is found. The tape is then scanned through blocks 214 and 216 for an SOD marker code. The scan continues until the SOD marker code is found at which point the programming enables the digitizer 14 through programming block 222 and initiates the host computer 16 read of the digitized data from 14 through block 224. The read of the digitized data by the host computer 16 continues while the scanning for an EOD marker occurs through blocks 226 and 228. The scan for the EOD marker continues until the EOD marker code is found and the digitizer disabled through block 230 and the host computer 16 read terminated through block 232.

After termination of the host computer 16 read, the programming checks through block 234 for other BCD identification codes to determine if other analog data is to be digitized. If there are additional BCD identification codes to be scanned, the programming control returns to the scan through block 210. If no additional BCD identification codes are to be found, the programming through block 236 determines whether another mode has been programmed through host computer 16. If no additional modes are programmed, the processing stops through block 238. If additional modes are to be performed by the programming, the new mode is entered through block 240 and control returned to point A in FIG. 4 to determine the selected mode in the manner previously described.

As will be appreciated, the above described operation in connection with FIG. 5 results in the digitization of only those selected periods of recorded analog data as are specifically selected by the BCD identification codes specified by the host computer 16 to be associated with the desired recorded analog data. In this way, each of the desired analog recordings can be digitized without requiring that all other analog recordings be digitized. Again, the selected digitization takes place without operator intervention and results in the compilation of identification and associated digitized analog data for further processing in host computer 16.

Referring now to FIG. 6, there is shown still another embodiment of a third mode of operation M3 in connection with the processing and digitizing system 10. In this embodiment, the same scan for the SOT/EOT code is performed through block 300, 302 and 304 and the tape rewound through block 306 if the tape is not originally in the beginning position. This mode of operation is similar to that described with respect to the equivalent portions of the flow diagram of FIGS. 4 and 5. Once the tape is in the beginning position and the SOT code is found through block 302, the program scans through blocks 308 and 310 for the BCD marker (BCDM) code and the EOT code. If no BCD marker code is found through block 310 and no EOT code found through block 312, the scanning continues until a BCD marker code is found. At that point, the programming reads the BCD identification data through block 320 to the host computer 16 and returns to block 308 for scanning of the next BCD marker. This continues until all BCD identification data is read by the host computer 16 for all of the periods of recorded analog data.

If the EOT is found through block 312, the programming determines whether another mode is to be selected through block 314 and, if not, stops the processing through block 316. If a new mode is to be selected by host computer 16, the new mode is entered through block 318 and the program control returns to point A in FIG. 4 for further processing as described in connection with that figure.

In this third embodiment of the programmed functions, the system enables the compilation of a directory map of the BCD identification information represented by the eight digit BCD codes associated with each period of analog data. This information may be used in connection with the programming previously described with respect to FIG. 5, as well as enable operator determination of all of the identity information concerning the collected analog data. Again, the directory can be obtained automatically without operator intervention and can be coordinated with other programming of the host computer 16 for implementing digitization of the analog data or aiding in the analysis or computation of such digitized data.

While the invention has been described with respect to specific system components and configuration as well as specific examples of programming modes, it will be apparent to one skilled in the art that other components and program operation could be used in connection with the data processing and digitizing system 10. By way of example, the programming of the decoder and interface system through microprocessor 60 or similar circuitry could stop the tape and the decoder after each read of data for data analysis and control the tape speed in connection with inputs programs through the host computer 16. The programming in cooperation with the host computer 16 and decoder interface system 18 could be implemented to control the time periods for start up and slow down of the tapes to insure proper tape speed during data read and digitization. Furthermore, the microprocessor 60 can be programmed to cooperate with the timing circuit 66 in system 18 and used to establish the timed duration of each of the periods of recorded analog data.

Obviously, a variety of other functions could also be performed utilizing the programming of the host computer 16 and decoder interface system 18 in connection with the identification, processing and digitization of recorded analog data. Accordingly, while the invention has been described in connection with specific elements and programming, many other variations and modifications are possible in light of the above teachings. It is therefore to be understood that within the scope of the appended claims, the invention may be practiced otherwise than as specifically described.

What is claimed is:

1. A system for automatically controlling the decoding of digital information and the digitization of corresponding portions of analog information comprising:
   first means for providing a data output from an analog medium having digital information and associated analog information recorded on the analog medium, wherein said data output comprises digital codes preceding and following each period of analog information;
   second means coupled to said first means for receiving analog information from said data output of said first means and responsive to a control signal for providing a digitized output of selected periods of said received analog information; and
   third means coupled to said first means and responsive to said digital information for selectively controlling said first means and providing a control signal to said second means to cause the digitization of selected periods of said recorded analog information from said data output.

2. The system of claim 1 wherein said third means includes means for causing the storage of the digital information from said data output and the digitized output of the corresponding periods of analog information.

3. The system of claim 1 wherein said first means comprises an analog tape player for providing playback of an analog magnetic tape.

4. The system of claim 1 wherein the third means comprises a host computer coupled to a decoder and interface system and programmed to coordinate storage of the data output from said first means and the digitized output of said second means.

5. The system of claim 4 wherein the decoder interface system includes a keyboard and display coupled to a microprocessor processor for initiating programs retained in the microprocessor.

6. A data processing and digitization system comprising:
   an analog tape player constructed and arranged to provide digital and analog data output from a prerecorded magnetic tape, wherein said data output comprises digital codes preceding and following each period of analog information;
   a digitizer coupled to receive the analog data output from the analog tape player and responsive to a control signal for digitizing said analog data output and providing a digitized output thereof;
   a decoder and interface system coupled to detect the digital data output from said analog tape player and programmed to control the movement of a prerecorded magnetic tape containing said data output and provide said control signal to said digitizer for generating a digitized output of said analog data output; and
   a host computer coupled to said decoder and interface system and said digitizer and programmed to initiate selected functions programmed in said decoder and interface system for controlling the movement of the magnetic tape and storage of said digital output and digitized output of the corresponding analog data output.

7. The system of claim 6 wherein said decoder and interface system includes a microprocessor programmed to provide said control signal in response to sensing of a predetermined digital code from said data output.

8. A system for automatically controlling the decoding of digital information and the digitization of corresponding portions of analog information comprising:
   first means for providing a data output from an analog medium having digital information and associated analog information recorded on the analog medium;
   second means coupled to said first means for receiving analog information from said data output of said first means and responsive to a control signal for providing a digitized output of selected periods of said received analog information; and
   third means coupled to said first means and responsive to said digital information for selectively controlling said first means and providing a control signal to said second means to cause the digitization of selected periods of said recorded analog information from said data output;

said third means including a computer and memory storing a program to perform the steps of:
(a) sequentially detecting a marker code and digital identification code associated with recorded analog information from the data output of said first means;
(b) detecting a start of data code following said identification code and coincident with the data output of associated analog information;
(c) generating said control signal to cause said digitized output of corresponding analog information in response to said start of data code;
(d) sensing an end of data code in the data output of said first means after the data output of the associated analog information; and
(e) repeating each of said steps (a)–(d) for each of a plurality of periods of analog information provided from the data output of the first means.

9. A system for automatically controlling the decoding of digital information and the digitization of corresponding portions of analog information comprising:
first means for providing a data output from an analog medium having digital information and associated analog information recorded on the analog medium, wherein said data output comprises digital codes preceding and following each period of analog information;
second means coupled to said first means for receiving analog information from said data output of said first means and responsive to a control signal for providing a digitized output of selected periods of said received analog information; and
third means coupled to said first means and responsive to said digital information for selectively controlling said first means and providing a control signal to said second means to cause the digitization of selected periods of said recorded analog information from said data output;
said third means including a computer and memory storing a program to perform the steps of:
(a) generating at least one digital identification code corresponding to digital information from said data output of said first means;
(b) detecting digital information from said data output corresponding to the generated at least one digital identification code;
(c) generating said control signal in response to said detected digital identification code corresponding to said generated at least one digital identification information; and
(d) detecting a digital code in the digital information of the data output of said first means to remove said control signal and terminate said digitized output.

10. The system of claim 9 wherein said at least one digital identification code is a plurality of digital identification codes and said program performs the additional step of repeating said generating and detecting steps for each generated digital identification code.

11. A system for automatically controlling the decoding of digital information and the digitization of corresponding portions of analog information comprising:
first means for providing a data output from an analog medium having digital information and associated analog information recorded on the analog medium, wherein said data output comprises digital codes preceding and following each period of analog information;
second means coupled to said first means for receiving analog information from said data output of said first means and responsive to a control signal for providing a digitized output of selected periods of said received analog information; and
third means coupled to said first means and responsive to said digital information for selectively controlling said first means and providing a control signal to said second means to cause the digitization of selected periods of said recorded analog information from said data output;
said third means including a computer and memory storing a program to perform the steps of:
(a) detecting a digital identification code in the digital information associated with analog information from said data output of the first means;
(b) storing identification information associated with said identification code;
(c) repeating steps (a) and (b) above until the digital identification codes associated with all periods of analog information have been stored to produce a directory of identification information associated with all periods of analog information.

12. A method of automatically processing analog information comprising:
(a) recording at least one period of analog data on an analog storage medium;
(b) recording digital data in proximity to said period of recorded analog data, said digital data including:
a digital marker code recorded prior to said analog data;
a digital identification code recorded subsequent to said digital marker code and prior to said analog data;
a start of data code recorded subsequent to said digital identification code and coincident with the beginning of said analog data;
and an end of data code recorded subsequent to the end of the analog data;
(c) providing an output of said recorded digital and associated analog data;
(d) detecting said recorded digital data and digitizing said at least one period of analog data in response to detection of said associated start of data code;
(e) storing said digitized analog data; and
(f) terminating said digitizing in response to a detection of said end of data code.

13. The method of claim 12 wherein said at least one period of analog data comprises a plurality of sequential periods of analog data and further comprising repeating steps (a)–(f) until all periods of analog data have been digitized and stored.

14. The method of claim 13 further comprising the step of recording a start of tape digital code at the beginning of the storage medium and an end of tape digital code at the end of the storage medium.

15. A method of automatically processing analog information comprising:
storing a plurality of periods of analog data and associated digital data on an analog medium, wherein said digital data precedes and follows each period of analog information;
detecting the digital data associated with each period of analog data; and
digitizing each period of analog data in response to the digital data corresponding to said periods of analog data.

16. The method of claim 15 further including the step of performing the detecting step sequentially for the plurality of periods of analog data.

17. The method of claim 15 further including the step of storing the digital data and corresponding digitized analog data for each of the periods of analog data.

18. The method of claim 15 further including the step of detecting digital identification information from the digital data and storing the digital identification information for each period of analog data.

* * * * *